3,296,000
SHAPED REGENERATED CELLULOSE PRODUCTS HAVING BACTERIOSTATIC PROPERTIES

Gregory C. Bockno, Media, and Joseph W. Schappel, Morton, Pa., assignors, by mesne assignments, to FMC Corporation, San Jose, Calif., a corporation of Delaware
No Drawing. Continuation of application Ser. No. 261,195, Feb. 26, 1963. This application Apr. 6, 1966, Ser. No. 540,514
8 Claims. (Cl. 106—15)

This application is a continuation of our application Serial Number 261,195, filed February 26, 1963, now abandoned.

The present invention relates to the production of shaped bodies, such as filaments and fibers, of regenerated cellulose having bacteriostatic properties.

Conventional procedures for imparting bacteriostatic properties to shaped bodies of regenerated cellulose generally involve impregnating or coating of regenerated cellulose filaments, fibers or fabrics formed therefrom with a suitable bacteriostatic composition followed by drying. Such bacteriostatic finishes often alter the hand or other physical properties of the treated materials and, more important, are generally fugitive and are thus readily removed by laundering or leaching in water.

It is an object of this invention to provide viscose solutions which are capable of being coagulated to form improved shaped bodies of regenerated cellulose having bacteriostatic properties.

It is a further object of this invention to provide improved bacteriostatic regenerated cellulose filaments, fibers, fabrics and like structures which retain their bacteriostatic properties after a considerable number of launderings in an aqueous medium.

Still further objects and advantages of the present invention will appear in the following detailed description and claims.

In accordance with the present invention, regenerated cellulose filaments, fibers and other shaped products having bacteria inhibiting properties are formed from a viscose containing 3,4,4'-trichlorocarbanilide in the particulate form. Aside from the incorporation of the bacteriostatic compound noted, the viscose and the spinning bath employed in making the shaped regenerated cellulose products of the present invention may be of conventional or known composition.

The manufacture of shaped products from viscose which exhibit bacteriostatic properties entails difficulties which are not generally encountered in melt or solution spinning procedures. The bacteriostatic compound, and solvents used with such compound, must not only be compatible with the viscose solution, but must be capable of resisting the acid environment and the subsequent processing procedures which are normally involved in the manufacture of regenerated cellulose products. Experience has shown that many bacteriostatic compounds survive the viscose and spinning operations, only to be lost in the final processing procedures which include de-sulfiding, bleaching and long periods of water washing. The present invention is predicated on our discovery that 3,4,4'-trichlorocarbanilide can survice the viscose, spinning, and after-treating procedures employed in making of regenerated cellulose products and methods which we have developed for incorporating the 3,4,4'-trichlorocarbanilide compound into the viscose in precipitate or particulate form.

The 3,4,4'-trichlorocarbanilide compound has very low solubility in water. This characteristic is, of course, ideal since the active bacteriostatic agent which is removed from the surface of the shaped products through laundering is continuously replaced with additional material which is leached under controlled rates from within such products. It is, however, soluble in certain organic solvents and thus various different procedures may be employed for introducing the same into the viscose. In one such procedure, organic solvent solutions of 3,4,4'- trichlorocarbanilide may be injected directly into a viscose under high-shear blending conditions. Organic solvents found to be satisfactory include polyethylene glycol, dimethyl formamide and acetone. Solutions of from about 1% to 10 or 15% or more of the 3,4,4'-trichlorocarbanilide in the above-noted solvents provide for a fine dispersion of the bacteriostatic compound when injected into the viscose to the extent of from 0.3% to 7%, based on the weight of the cellulose. When relatively dilute solutions are employed, the bacteriostatic compound appears as minute particles in the viscose and thus satisfactory spinning conditions can be well maintained. As the concentration of the 3,4,4'-trichlorocarbanilide in the solvent is increased, there is a greater tendency for the bacteriostatic compound to precipitate as comparatively large plate-like crystals which readily clog the spinneret openings.

In lieu of direct injection into the viscose, the organic solvent solution of the bacteriostatic compound, prepared as described above, may be precipitated as a sub-micron dispersed 3,4,4'-trichlorocarbanilide in water containing a suitable surface active wetting or dispersing agent. For example, a 1.5% solution of 3,4,4'-trichlorocarbanilide in acetone or dimethyl formamide, at room temperature, may be slowly added to and vigorously mixed with an aqueous solution containing about 0.05% Duponol ME (sodium lauryl sulfate). The resulting dispersion contains about 0.4% of 3,4,4'-trichlorocarbanilide having particle sizes of about 1 micron or less, and may be injected directly into the viscose which is being spun. Alternatively, the dispersion may be centrifuged or permitted to settle and decanted when concentration of the bacteriostatic compound and/or solvent recovery are important considerations. With these last mentioned procedures, the bacteriostatic particles are redispersed in an aqueous medium before injection into a viscose.

With the above-described precipitation procedure the small particles of the bacteriostatic particles provided are conducive to good spinning operations for extended periods, and the bacteriostatic properties of the shaped regenerated cellulose products produced by this procedure are generally satisfactory. It has been found, however, that particles of 3,4,4'-trichlorocarbanilide of one micron or less are usually solvated to a large extent after some ten or fifteen laundering cycles. This particular procedure is therefore best suited for producing shaped regenerated cellulose products which undergo little laundering or are intended to exhibit bacteriostatic properties for limited periods.

The 3,4,4'-trichlorocarbanilide available commercially includes particles having an average size of from about 3 to 5 microns and a maximum size which may range up to about 20 microns. By attriting this commercial compound, as by a conventional dry-fluid energy grinding system, the particles can be reduced in size to an average of about 2 microns and a maximum of about 7 microns. Particles of this size are not entirely satisfactory for good spinnability. These larger particles can be removed by permitting the same to settle from an aqueous dispersion of such attrited materials. For example, an aqueous dispersion originally containing about 8% of attrited 3,4,4'-trichlorocarbanilide and a surface active agent, showed fewer particles larger than 3 or 4 microns after a settling period of between 3 and 4 hours. This remaining dispersion of "classified" particles may be injected into the viscose and enables acceptable spinning operations to be effected for extended periods.

As noted above, the presence of large size particles renders the commercially available 3,4,4'-trichlorocarbanilide unsuitable for uninterrupted spinning operations. It was discovered, however, that these larger size particles were caused by flocculation and agglomeration of the smaller size particles, and that this effect could be eliminated or materially reduced by employing a non-ionic (low foaming) surface active agent, such as "Sterox AP" (polyoxyethylene ether). For example, an 8.0% concentration of commercially available 3,4,4'-trichlorocarbanilide may be dispersed in an aqueous solution of 0.05% "Sterox AP" and may be injected into a conventional viscose to provide the same with a 2% concentration of 3,4,4'-trichlorocarbanilide, based on the weight of the cellulose. Such dispersion has been found to provide trouble-free spinning of regenerated cellulose filaments for extended periods with no accumulation of insoluble matter being apparent on the filters or spinneret normally employed. As with the previously described procedure, this method of dispersing the 3,4,4'-trichlorocarbanilide permits particles of the bacteriostatic compound larger than 1 micron, and preferably particles having an average size of from 3 to 5 microns, to be injected into the viscose so that resulting shaped regenerated cellulose articles possess more permanent or lasting bacteriostatic activity. This last described method also permits easier and more economical preparation of the dispersion of the bacteriostatic compound and is therefore the preferred method of the present invention.

The active bacteriostatic properties of the regenerated cellulose shaped products which are formed and the ability of the shaped products to retain such properties will, in general, vary with the amount and particles size of 3,4,4'-trichlorocarbanilide initially added to the viscose. As heretofore mentioned, particles of the bacteriostatic compound having a size of 1 micron or less are readily solvated and should therefore be employed in shaped products which are intended to undergo little or no laundering. To provide shaped regenerated cellulose products with "durable" or "permanent" bacteriostatic properties, that is, bacteriostatic activity which can withstand the usual textile finishing operations and through at least twenty home-type or commercial laundering cycles, the shaped products should include from about 1.0% to 3.0% of 3,4,4'-trichlorocarbanilide, based upon the weight of the cellulose. With the addition of as little as 0.125% of the 3,4,4'-trichlorocarbanilide, based upon the weight of the cellulose, shaped regenerated cellulose products are produced which exhibit some bacteriostatic activity. However, with such a small concentration of 3,4,4'-trichlorocarbanilide, the bacteriostatic activity is rapidly lost during normal use of the shaped products and rarely withstands as many as ten home laundering cycles. When considering the bacteriostatic properties from the standpoint of cost and/or the useful life of the resulting regenerated cellulose products, the amount of 3,4,4'-trichlorocarbanilide employed should perhaps not exceed more than 10% to 15%, again based upon the weight of the cellulose.

The 3,4,4'-trichlorocarbanilide originally added to the viscose appears as finely divided particles embedded in the finished regenerated cellulose products, and do not materially affect the hand, color, luster, dyeability nor launderability of such products.

As heretofore mentioned the viscose may be of conventional composition, containing from about 4% to about 10% cellulose, about 4% to about 8% caustic soda and from about 30% to about 50% carbon disulfide; based upon the weight of the cellulose. The modified viscose, that is, the viscose containing the 3,4,4'-trichlorocarbanilide may have any desired salt test at the time of spinning or extrusion. If desired, the viscose may contain other known additives so as to improve the physical properties of the regenerated cellulose products and to alter the fine structure of the cellulose as is commonly practiced in the industry.

The viscose is formed in the conventional manner and either during its preparation or just prior to spinning may be further modified by the addition of a viscose or coagulation modifier. A large number of modifiers are known and are in use in the production of the various types of viscose rayon. These modifiers include polyoxyalkylene glycols such as polyoxyethylene glycols, polyoxypropylene glycols and block copolymers of propylene and ethylene oxides; various amines including monoamines, diamines and polyamines such as diethylamine, dimethylamine, ethylene diamine and diethylene triamine; reaction products of alkylene oxides with fatty acids, fatty alcohols, fatty amines, aromatic acids, aromatic alcohols, aromatic amines, partial esters of fatty acids and polyhydric alcohols such as reaction products of ethylene oxide with lauryl alcohol, phenol, lauryl amine, glycerol monostearate, etc.; quaternary ammonium compounds and the like. The amount of modifier may vary from about 2% to about 5%, based on the weight of the cellulose.

When using conventional viscose modifiers or coagulation modifiers, it is preferred to utilize a combination of modifiers such as a monoamine and a polyoxyalkylene glycol or a polyoxyalkylene glycol ether of an aromatic alcohol or of a polyhydric alcohol wherein the glycol or ether has a molecular weight of between about 600 and about 4000 to 6000; for example, dimethylamine and a polyoxyethylene glycol or a polyethylene glycol ether of phenol or of sorbitol having a molecular weight within the stated range. In the use of the combination, the monoamine is added to an amount of from about 1.5% to 3.5% and the glycol or ether in an amount of from about 1% to 3%, both proportions being based upon the weight of the cellulose.

The spinning bath employed in coagulating the modified viscose may also be of conventional composition and may include from about 5% to 10% sulfuric acid, from about 1% to 15% zinc sulfate and from about 10% to 25% sodium sulfate, preferably from 1% to 7% zinc sulfate and 15% to 22% sodium sulfate. Other metal sulfates, such as iron, manganese, nickel and the like may be present and may replace some of the zinc sulfate. The temperature of the spinning bath may vary from 25° C. to about 80° C., and is preferably between 45° C. and 70° C. to insure that the resulting regenerated cellulose filaments and fibers possess good physical properties, and especially tensile strength which suffers somewhat as compared with conventional filaments, as will be more apparent hereafter.

From the spinning bath, and prior to washing, the filaments may be passed through a stretch bath and stretched from about 25% to 145% during their passage through the bath. The stretch bath is maintained at a temperature between about 85° C. and 100° C. and may be a hot water bath or may contain 1% to 5% sulfuric acid with or without from about 10% to 4% zinc sulfate and from about 4% to 7% sodium sulfate.

The filaments are then subjected to the usual after-treatments which include washing and desulfurizing and, if desired, bleaching either before or after collection of the filaments. The filaments may or may not be provided with a yarn finish before being dried.

The regenerated cellulose shaped products, such as filaments and fibers, formed in accordance with the present invention may be converted into fabrics using conventional processes and equipment. Preferably, such filaments and fibers are used alone but may be intimately blended with 50 to 60% of conventional filaments or fibers without eliminating the bacteriostatic properties of the fabric.

The invention may be further illustrated by reference to the preparation of regenerated cellulose filaments from a viscose containing about 7.5% cellulose, about 6.5% caustic soda, and having a total carbon disulfide content of about 38.5%, based on the weight of the cellulose.

The viscose solution was prepared by xanthating alkali cellulose by the introduction of 38.5% carbon disulfide based on the weight of the cellulose and churning for about 2½ hours. The cellulose xanthate was then dissolved in caustic soda solution. About 2.0% dimethylamine and 1.3% of a polyoxyethylene glycol having a molecular weight of about 1500 was added to and mixed with the viscose. Dry powdered commercially available 3,4,4'-trichlorocarbanilide was pasted by mixing with a small amount of water to which "Sterox AP" had been added. After being wet out, water was added to give an 8.0% solid slurry with 0.05% "Sterox AP," which was mixed for about 30 minutes at high speed.

The above-described dispersion of 3,4,4'-trichlorocarbanilide was injected into the viscose solution as it was extruded through a spinneret to form 600 denier, 400 filament yarns at a rate of about 50 meters per minute. The coagulating and regenerating bath was maintained at a temperature of about 60° C. and contained 10.0% sulfuric acid, 1.0% zinc sulfate and 21.0% sodium sulfate. The yarn was stretched about 50% while passing through a cascade bath (93° C.) of 5% acid. The yarn was passed through the conventional rayon processing cycle, including a hydrochlorite bleach bath, collected in spinning boxes, washed free of acids and salts and dried. Spinning of the modified viscose was completely satisfactory with no evidence of filter clogging or jet slubbing. The processed yarn contained 2.0% of 3,4,4'-trichlorocarbanilide, based upon the weight of the cellulose, and was white and soft.

Employing a viscose, spinning bath and procedure as described above additional yarn samples were prepared, having 0.25%, 0.5%, 1.0%, and 3.6% of 3,4,4'-trichlorocarbanilide, based upon the weight of the cellulose. Each of the yarn samples was made into an individual pad by being first spread evenly over one-half of a cotton gauze fabric, after which the uncovered half of the gauze was folded over the sample and then stitched along the borders and across the pad width, both perpendicularly and diagonally. During the laundering stage, short sections were cut from the individual pads after the pads had been subjected to selected number of laundering cycles, with the cut areas of the pads being stitched after each cutting thereof.

All samples were individually laundered in a Philco Bendix High Capacity Automatic Washer, Model W–216, along with a 4-pound ballast fabric using hot water (145° F.), ⅓ cup of "All" detergent, and warm rinse water. After a wash cycle of 9 minutes at high agitation speed, the wash load was subjected to the usual rinse and spin cycle and oven dried at 75° C.

The cut sections of the sample pads were tested for bacteriostatic activity using the conventional pour plate method. In brief this method involves placing a test sample on a nutrient agar which had been previously inoculated with a specific strain of bacteria, with the *Micrococcus pyogenes*, var. *aureous* strain of bacteria, being employed in the present instance. With the test sample in place on the inoculated agar plate the sample is incubated for 24 hours at 37° C., after which the plate is examined. Bacteriostatic activity is judged by the absence of bacterial growth around the test sample, as evidenced by the presence of a halo around the sample periphery. The halo size, that is, the width of the clear area, is taken as a measure of the degree of bacterial inhibition so that wide and distinct halos denote excellent bacteriostatic properties. The area under the sample is also examined for signs of bacterial growth. Complete inhibition of growth under the same is termed "No Growth in the Contact Area" (hereafter referred to as NGCA) and is considered to be positive bacteriostatic activity, even in the absence of a halo.

The bacteriostatic properties of the various yarn samples noted above were as follows:

BACTERIOSTATIC ACTIVITY

| Sample (Percent 3,4,4'-trichlorocarbanilide based on weight of cellulose) | Laundering Cycles | | | |
|---|---|---|---|---|
| | Unlaundered | 10 cycles | 20 cycles | 30 cycles |
| 0.25 | NGCA—irregular halo of 1.5-2.0 mm. | Numerous colonies of bacteria in contact area. | | |
| 0.50 | NGCA—irregular halo of 1.5-2.0 mm. | Numerous colonies of bacteria in contact area. | | |
| 1.0 | NGCA—halo of 1.0 mm. plus a dim halo. | Mostly no growth plus dim halo. | | |
| 2.0 | NGCA—1.0 mm. to 5.0 mm. halo. | NGCA—2.1 mm. halo plus dim halo. | NGCA—dim halo 0.5 mm. | NGCA—1.0-4.0 halo. |
| 3.6 | NGCA or around contact area. | NGCA—11.5 mm. halo. | NGCA—halo 2.0 mm. to 5.0 mm. | NGCA—halo 2.7 mm. to 3.5 mm. |

We claim:

1. A process for producing shaped bodies of regenerated cellulose which have bacteriostatic properties which includes the steps of extruding through a shaping orifice and into an aqueous acidic coagulating solution a viscose solution containing from about 4% to 10%, by weight, of cellulose having incorporated therein not less than 0.25%, by weight based on said cellulose, of 3,4,4'-trichlorocarbanilide in particulate form to impart bacteriostatic properties to a dry-shaped product of regenerated cellulose prepared from said solution, subjecting the thus extruded solution to the action of the aqueous acid solution until the extruded solution is coagulated, converting the coagulated solution to regenerated cellulose and subsequently drying the shaped products of regenerated cellulose.

2. A process as defined in claim 1 wherein said viscose contains from about 1.0% to about 10% to 15%, by weight, based on said cellulose of 3,4,4'-trichlorocarbanilide in particulate form.

3. A process as defined in claim 2 wherein said 3,4,4'-trichlorocarbanilide is precipitated in the viscose from an organic solvent solution.

4. A process as defined in claim 2 wherein said 3,4,4'-trichlorocarbanilide is injected into the viscose in particulate form after being precipitated in water containing a surface active agent from an organic solvent solution.

5. A process as defined in claim 2 wherein the 3,4,4'- trichlorocarbanilide is injected into the viscose as a dispersion obtained by separation from an aqueous solution containing a surface active agent and particles of attrited 3,4,4'-trichlorocarbanilide having a size of from about 2 to 7 microns.

6. A process as defined in claim 2 wherein the 3,4,4'-trichlorocarbanilide is injected into the viscose as an aqueous dispersion containing a non-ionic surface active agent and 3,4,4'-trichlorocarbanilide particles having an average size of from about 3 to 5 microns.

7. A process as defined in claim 6 wherein the injected particles of 3,4,4'-trichlorocarbanilide having a size of not less than about 1 micron.

8. A shaped product of regenerated cellulose having durable bacteriostatic properties formed by the process of claim 6.

References Cited by the Examiner
UNITED STATES PATENTS 3,034,957  5/1962  Smith et al. _____ 167—38.5
3,161,622  12/1964  Harrington et al. __ 167—38.6 XR ALEXANDER H. BRODMERKEL, *Primary Examiner.*

L. HAYES, *Assistant Examiner.*

UNITED STATES PATENT OFFICE
CERTIFICATE OF CORRECTION

Patent No. 3,296,000　　　　　　　　　　　　　January 3, 1967

Gregory C. Bockno et al.

It is hereby certified that error appears in the above numbered patent requiring correction and that the said Letters Patent should read as corrected below.

Column 4, line 56, for "10%" read -- 1% --; column 5, line 48, for "hydrochlorite" read -- hypochlorite --; line 71, for "hot water" read -- hot wash water --; column 6, line 18, for "same" read -- sample --.

Signed and sealed this 26th day of September 1967.

(SEAL)
Attest:

ERNEST W. SWIDER　　　　　　　　　　　　　EDWARD J. BRENNER
Attesting Officer　　　　　　　　　　　　　Commissioner of Patents